(12) United States Patent
Shiino et al.

(10) Patent No.: US 7,866,434 B2
(45) Date of Patent: Jan. 11, 2011

(54) STEERING APPARATUS

(75) Inventors: Kohtaro Shiino, Isehara (JP); Akira Takahashi, Isehara (JP); Toshiro Yoda, Higashimatsuyama (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 12/186,858

(22) Filed: Aug. 6, 2008

(65) Prior Publication Data

US 2009/0057050 A1 Mar. 5, 2009

(30) Foreign Application Priority Data

Aug. 28, 2007 (JP) ............................. 2007-220691

(51) Int. Cl.
*B62D 5/04* (2006.01)
*B62D 7/18* (2006.01)

(52) U.S. Cl. .................... 180/411; 180/412; 280/93.512

(58) Field of Classification Search ................. 180/411, 180/412; 280/93.512

See application file for complete search history.

(56) References Cited

U.S. PATENT DOCUMENTS 5,381,705 A * 1/1995 Takahashi .................... 74/498
6,688,416 B2 * 2/2004 Higaki et al. ................ 180/253
6,974,138 B2 * 12/2005 Perello et al. ............. 280/5.522
7,370,552 B2 * 5/2008 Yun .......................... 74/484 R
2003/0111289 A1 * 6/2003 Brill et al. .................... 180/431
2007/0045036 A1 3/2007 Takeuchi et al.
2007/0131474 A1 * 6/2007 Zetterstroem ............... 180/411

FOREIGN PATENT DOCUMENTS

JP        2007-1564 A        1/2007
JP        2007-55409 A       3/2007

* cited by examiner

*Primary Examiner*—Lesley Morris
*Assistant Examiner*—Marlon A Arce
(74) *Attorney, Agent, or Firm*—Foley & Lardner LLP

(57) ABSTRACT

A steering apparatus includes an axle housing rotatably supporting a wheel hub on which a steered road wheel is installed, and a lower suspension-system control arm adapted to be oscillatingly supported at one end on a vehicle body and having a turning portion provided at the other end for pivotably supporting the axle housing by the turning portion. An electric motor is installed on the lower arm for turning the axle housing by a driving force produced by the motor. A rotation axis of the motor and a pivot of the axle housing are arranged to be offset from each other.

16 Claims, 3 Drawing Sheets

STEERING APPARATUS

TECHNICAL FIELD

The present invention relates to a steering apparatus, and specifically to an automotive steer-by-wire (SBW) vehicle steering system configured to steer a plurality of steered road wheels independently of each other by means of respective steering actuators.

BACKGROUND ART

In recent years, there have been proposed and developed various automotive steer-by-wire (SBW) vehicle steering systems in which a steering reaction torque applied to a steering wheel and a steer angle at each steered road wheel can be arbitrarily determined. Such an automotive SBW vehicle steering apparatus generally employs a pair of steering actuators, each mechanically disconnected from a steering wheel. One such SBW vehicle steering apparatus, which is configured to steer a plurality of steered road wheels independently of each other by means of respective steering actuators, has been disclosed in Japanese Patent Provisional Publication No. 2007-55409 (hereinafter is referred to as "JP2007-055409"), corresponding to United States Patent Application Publication No. US 2007/0045036 A1 and also disclosed in Japanese Patent Provisional Publication No. 2007-1564 (hereinafter is referred to as "JP2007-001564"). In a steering device (or a turning device including a turning motor and a speed reducer) disclosed in JP2007-055409, in order to avoid undesired interference between a steering actuator (or a turning actuator) and a hub carrier (a road-wheel side component part provided between upper and lower control arms), the turning actuator is laid out, such that the rotation axis of the turning actuator and the kingpin axis (serving as a turning center of the steered road wheel) are arranged substantially coaxial with each other. On the other hand, in a steer-by-wire system disclosed in JP2007-001564, in order to enhance the layout flexibility of engine component parts by compactifying the SBW system, a steering actuator is fixed onto or mounted on the vehicle body. The output (i.e., rotary motion) of the steering actuator is converted into oscillating motion of a pitman arm. The oscillating motion of the pitman arm is further transmitted through a linkage, such as a tie rod and a steering knuckle arm, so as to steer or turn the associated steered road wheel.

SUMMARY OF THE INVENTION

Generally, to convert rotary motion of an electric motor into torque needed to turn the steered road wheel, a speed reducer having a high reduction ratio must be combined with the electric motor. Conversely speaking, to downsize a speed reducer, a high-torque motor must be used. For instance, a speed reducer can be eliminated by using a direct-drive motor. However, in such a case, the direct-drive motor itself must be large-sized to produce a required torque. Therefore, the overall size and gross weight of the steering actuator, which is constructed by the electric motor and the speed reducer, are determined depending on a required torque (i.e., a design maximum torque output).

In the steering device (the turning device) disclosed in JP2007-055409, the steering actuator is installed on the outside end of the lower arm of the suspension system. The outside end of the lower arm serves as a lower pivot of the kingpin axis (that is, the steering axis). As previously discussed, the steering actuator, constructed by a speed-reducer-equipped motor or a direct-drive motor, requires a specified size and weight, determined based on a required torque. Therefore, practically, it is very difficult to install the steering actuator, having the specified size and weight based on the required torque, on the outside end of the suspension-system control arm coaxially with the kingpin axis, while avoiding undesired interference with road-wheel side component parts, for example, a hub carrier or a tire. In other words, it is very difficult to install the steering actuator on the outside end of the suspension-system control arm, while ensuring an adequately high reduction ratio (that is, an adequately high torque produced to turn the steered road wheel).

As discussed previously, the steering actuator, constructed by a speed-reducer-equipped motor, requires a specified size and weight, determined based on a required torque. Additionally, the steering actuator having the specified weight is installed on the outside end of the suspension-system lower arm (i.e., the road-wheel side installation position of the lower arm). This means an increase in a moment of load acting on the lower arm, in other words, an increase in unsprung mass (unsprung weight), thereby deteriorating driving stability (both vehicle driveability and vehicle stability) and riding comfort.

On the other hand, in the SBW system of JP2007-001564, the steering actuator is installed on the vehicle body, and additionally the steering actuator, constructed by a speed-reducer-equipped motor, requires a specified size and weight, determined based on a required torque. Thus, there is a possibility of undesired interference between the steering actuator and vehicle-body side component parts (such as engine component parts). Therefore, there is a limit for layout flexibility improvement. In addition to the above, the tie rod is mechanically linked to the steering actuator installed on the vehicle body, and thus, during suspension stroke, toe changes occur owing to the positional relationship (the suspension geometry) between the tie rod and the suspension-system control arm. Such toe changes can be compensated for by controlling the respective steering actuators, but the toe-change compensation requires a new control logic (i.e., additional arithmetic and logical operations), thereby resulting in the undesirably complicated SBW system.

It is, therefore, in view of the previously-described disadvantages of the prior art, an object of the invention to provide a steering apparatus configured to enhance its layout flexibility and saleability, without sacrificing riding comfort.

In order to accomplish the aforementioned and other objects of the present invention, a steering apparatus comprises an axle housing rotatably supporting a wheel hub on which a steered road wheel is installed, a lower arm adapted to be oscillatingly supported at one end on a vehicle body and having a turning portion provided at the other end for pivotably supporting the axle housing by the turning portion, and an electric motor installed on the lower arm for turning the axle housing by a driving force produced by the motor, wherein a rotation axis of the motor and a pivot of the axle housing are arranged to be offset from each other.

According to another aspect of the invention, a steering apparatus comprises an axle housing rotatably supporting a wheel hub on which a steered road wheel is installed, a lower arm adapted to be oscillatingly supported at one end on a vehicle body and having a turning portion provided at the other end for pivotably supporting the axle housing by the turning portion, and an electric motor installed on the lower arm for turning the axle housing by a driving force produced by the motor, wherein the motor is arranged closer to the vehicle body rather than a steering axis serving as a pivot of the axle housing.

According to a further aspect of the invention, a steering apparatus comprises an axle housing rotatably supporting a wheel hub on which a steered road wheel is installed, a lower arm adapted to be oscillatingly supported at one end on a vehicle body and pivotably supporting the axle housing at the other end, an electric motor installed on the lower arm for turning the axle housing by a driving force produced by the motor, and a speed reducer configured to reduce rotation of the motor, wherein the motor and the speed reducer are arranged from the vehicle body in that order.

The other objects and features of this invention will become understood from the following description with reference to the accompanying drawings.

DESCRIPTION OF THE PREFERRED EMBODIMENTS

First Embodiment

Figure 1:
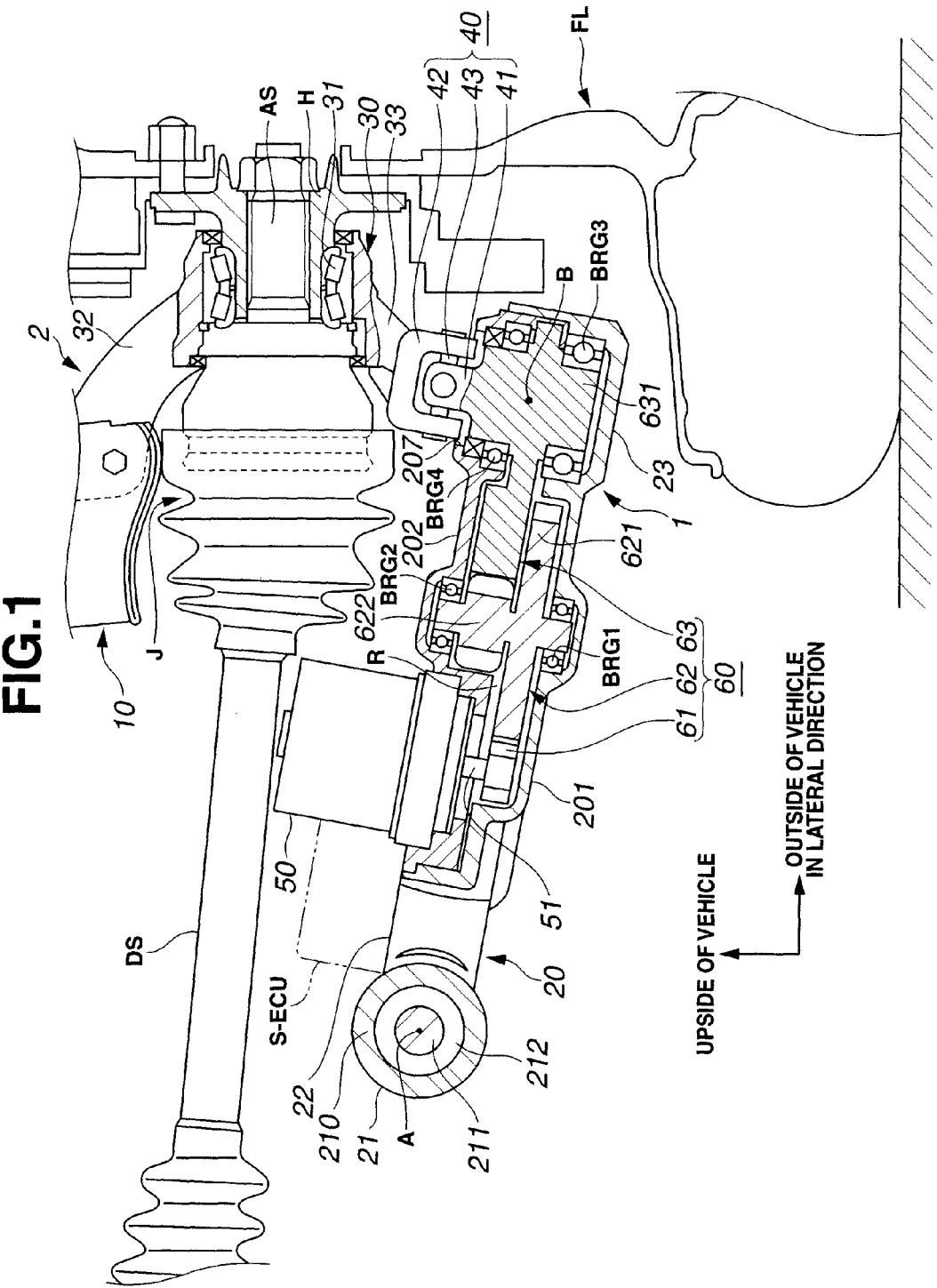
FIG. 1 is a partial cross-sectional view illustrating a first embodiment of an automotive vehicle steering apparatus (only the front-left side), as viewed from the front face of the vehicle.

Referring now to the drawings, particularly to FIG. 1, the steering apparatus 1 of the first embodiment is exemplified in a so-called steer-by-wire (SBW) system of an automotive vehicle, in which front-left and front-right steered road wheels FL, FR, each rotatably supported by a suspension system 2, are steered independently of each other by driving forces produced by respective steering actuators, each comprised of an electric motor and a speed reducer.

The SBW system includes a steering input device (i.e., a steering wheel or the like), steered road wheels (front-left and front-right steered road wheels FL-FR), which are mechanically disconnected from the steering input device, a steering angle sensor (e.g., a steering wheel angle sensor) provided to electrically detect an angular displacement (e.g., a steering wheel angle) of the steering input device measured from the straight ahead position (corresponding to zero average steer angle of the front-left and front-right steered road wheels), a steering torque sensor provided to electrically detect the magnitude and direction of steering torque applied to the steering input device, a pair of steering actuators that produce driving torques (or driving forces) by which respective steered road wheels FL-FR are steered independently of each other, and a steering electronic control unit (a steering controller) S-ECU configured to calculate at least a steer angle of each of the steered road wheels FL-FR, based on a sensor signal from the steering angle sensor, for controlling the operation (the magnitude and sense of driving torque) of each of the steering actuators. In a similar manner to a conventional SBW system, the steering input device is mechanically connected to a steering reaction-torque actuator (simply, a reaction actuator) that applies a reaction torque (or a feedback torque) to the steering input device (e.g., the steering wheel).

The steering controller S-ECU is electrically connected to both the steering actuator (comprised of an electric motor 50 and a speed reducer 60 both described later) and the reaction actuator. The S-ECU is also connected electrically to a vehicle electronic control unit (a vehicle controller) V-ECU. The V-ECU generally comprises a microcomputer. The V-ECU includes an input/output interface (I/O), memories (RAM, ROM), and a microprocessor or a central processing unit (CPU). The input/output interface (I/O) of the V-ECU receives input information from various engine/vehicle sensors, for example, a suspension stroke sensor installed on suspension system 2, wheel speed sensors, each installed on a wheel hub H (a center part of the road wheel), and the like. Within the V-ECU, the central processing unit (CPU) allows the access by the I/O interface of input informational data signals from the previously-discussed engine/vehicle sensors. The CPU of the V-ECU is responsible for carrying the control program stored in memories and is capable of performing necessary arithmetic and logic operations containing vehicle speed control, wheel speed control, yaw rate control, and the like. Computational results, that is, calculated output signals are relayed through the output interface circuitry of the V-ECU to output stages (e.g., a throttle actuator, an automatic brake actuator or a hydraulic brake modulator, and the like). The V-ECU is also configured to send out vehicle information (e.g., vehicle speed) and a desired steer angle at each steered road wheel to the S-ECU.

As discussed above, the steering controller S-ECU receives sensor signals from the engine/vehicle sensors via the V-ECU and sensor signals from the steering angle sensor and the steering torque sensor, and then calculates, based on the input information, a driving torque (exactly, the magnitude and sense of driving torque to be produced by each steering actuator (especially, motor 50). Thereafter, the S-ECU generates control command signals corresponding to the calculated driving torques to the respective steering actuators during the steer-by-wire (SBW) operating mode. Additionally, the S-ECU calculates a reaction force acting on the tire (the steered road wheel) by the road surface, based on the previously-noted vehicle information and the electric current applied to each of the steering actuators and the rotation angle of each of the steering actuators. The S-ECU also generates a control command signal corresponding to the calculated road-surface reaction force to the reaction actuator during the SBW operating mode. In the SBW system as discussed above, there are the following several merits.

The adoption of such an SBW system ensures the enhanced layout flexibility and the increased degree of freedom of design for steering-system component parts. Therefore, it is possible to realize the compact steering system. Additionally, in the SBW system in which front-left and front-right steered road wheels FL-FR can be steered independently of each other by means of respective steering actuators, it is possible to properly maximize cornering forces produced by respective front-left and front-right steered road wheels FL-FR by actively changing a ratio between steer angles at the front-left and front-right steered road wheels, thereby enhancing the maneuverability of the vehicle. Furthermore, on front-wheel-drive vehicles, by way of active toe-change, it is possible to actively compensate for toe-in, occurring due to a driving force resulting from driving torque application to each of front steered road wheels FL-FR and a suspension elasticity of each of front suspension systems 2, 2, thereby effectively reducing a rolling resistance force resulting from energy losses due to deformations of each of front steered road wheels FL-FR. This contributes to the reduced fuel consumption rate.

(Steering System Configuration)

Steering apparatus 1 of the first embodiment, constructing a part of the SBW system, which system is applied to a front-wheel-drive vehicle, is hereunder described in detail in reference to FIG. 1. Note that FIG. 1 shows the partial cross-sectional view of only the front-left side of steering apparatus 1 of the first embodiment, when viewed from the front face of the vehicle.

Suspension system 2 is a so-called strut type suspension system. Suspension system 2 is comprised of a strut 10 employing both a coil spring and a shock absorber for absorbing impact loads acting in the vertical direction (in the direction of the vehicle z-axis), a lower control arm (simply, a lower arm) 20 pivoted to a vehicle body for pivotably supporting front-left steered road wheel FL to the vehicle body, and an axle housing 30 rotatably supporting an axle shaft AS.

Axle shaft AS is connected via a constant-velocity joint J (covered by a protective boot) to the outside end of a drive shaft DS. Wheel hub H is fixedly connected to the circumference of axle shaft AS, for co-rotation with axle shaft AS. A wheel bearing 31 is interposed between hub H and axle housing 30, for rotatably supporting hub H on axle housing 30 via wheel bearing 31. Front-left steered road wheel FL is installed onto hub H (exactly, hub bolts of hub H) at the outside of wheel bearing 31 in the lateral direction (in the direction of the vehicle y-axis). Axle housing 30 has a first arm 32 extending upwards from the outer periphery of the cylindrical-hollow portion of axle housing 30 and a second arm 33 extending downwards from the cylindrical-hollow portion of axle housing 30.

The lower end of strut 10 is mechanically linked to the first arm 32, whereas the upper end of strut 10 is connected via a strut insulator to the vehicle body. Strut 10 is supported to rotate about its strut axis, responsively to a pivoting motion of first arm 32 (axle housing 30), occurring when the steered road wheels are turned.

Lower arm 20 is an A-shaped lower control arm or a Γ-shaped lower control arm, which is generally used as a strut-type front suspension system. Lower arm 20 is pivotally or oscillatingly supported on the vehicle body by means of two lower-arm pivots (hereinafter are referred to as "supporting portions 21, 21") spaced apart from each other in the vehicle longitudinal direction. Each of supporting portions 21, 21 has the same structure as a typical vehicle-body side control-arm supporting portion generally applied to a typical A-shaped lower control arm (or a typical Γ-shaped lower control arm) not employing a steering actuator. Also, each supporting portion 21 is installed on the vehicle body at the same installation position as the typical vehicle-body side control-arm supporting portion. In the first embodiment, supporting portion 21 is constructed by a cylindrical, elastic or elastomeric bushing, which is comprised of an outer bushing sleeve 210, an inner bushing shaft (or an inner bushing sleeve) 211, and a rubber bushing 212 press-fitted between outer and inner bushing sleeves 210 and 211. Each supporting portion 21 is installed on the vehicle body, such that the axis of supporting portion 21 (the axis of the bushing) extends in the longitudinal direction (in the direction of the vehicle x-axis).

Outer bushing sleeve 210 is formed integral with lower arm 20 (exactly, an arm portion 22 described later). As can be seen from the lateral cross section of the rubber-bushed supporting portion 21 in FIG. 1, inner bushing sleeve 211 is provided inside of outer bushing sleeve 210, interposing rubber bushing 212 between outer and inner bushing sleeves 210-211. Inner bushing sleeve 211 is fixed to or attached to the vehicle body. The axes of two rubber-bushed supporting portions 21, 21 are arranged substantially coaxial with each other in their longitudinal directions (in the direction of the vehicle x-axis), and thus, in FIG. 1, only the rubber-bushed supporting portion 21 of the near side is shown. That is, the straight line, linking the axes of two rubber-bushed supporting portions 21, 21, is arranged substantially in parallel with the ground surface. Lower arm 20 is pivotally supported on the vehicle body by means of two rubber-bushed supporting portions 21, 21 in such a manner as to oscillate about the previously-noted straight line, linking the axes of supporting portions 21, 21, substantially in the vertical direction of the vehicle (in the direction of the vehicle z-axis). That is, the straight line through the axes of supporting portions 21, 21 serves as the pivot of oscillating motion of lower arm 20.

Lower arm 20 has the arm portion 22 extending laterally outwards from the rubber-bushed supporting portions 21, 21 attached to the vehicle body, and a turning portion 23 installed on the outside end of lower arm 20. Second arm 33 of axle housing 30 is linked via a universal joint 40 to turning portion 23. In the first embodiment, a Hooke's joint, which consists of two yokes attached to their respective shafts and connected by means of a spider, is used as universal joint 40.

A plurality of gears 61-63, constructing speed reducer 60, are built in arm portion 22. A rotational shaft (i.e., a rotation axis) 631 of the third gear 63 is installed in turning portion 23. A driving-side yoke 41, whose axis is arranged coaxial with the axis of rotational shaft 631 of third gear 63, is formed integral with the upper face of third gear 63.

On the other hand, a driven-side yoke 42 is formed integral with the lower end of second arm 33 of axle housing 30. Driving-side yoke 41 and driven-side yoke 42 are connected by a spider 43. When driving-side yoke 41 rotates together with third gear 63, rotary motion of driving-side yoke 41 is transmitted through spider 43 to driven-side yoke 42. As a result of this, second arm 33 turns or pivots. That is, lower arm 20 pivotably supports axle housing 30 by means of turning portion 23. The center of universal joint 40 serves as a lower outer pivot of front-left steered road wheel FL. On the other hand, the installation point of the upper end of strut 10 to the vehicle body serves as an upper outer pivot of front-left steered road wheel FL. Therefore, the straight line, linking the installation point of the upper end of strut 10 to the vehicle body (i.e., the upper outer pivot) and the center of universal joint 40 (i.e., the lower outer pivot), corresponds to a kingpin axis (i.e., a steering axis or a steer rotation axis) of front-left steered road wheel FL.

Suppose that front-left steered road wheel FL travels on uneven road surfaces during vehicle driving. Oscillating motion of lower arm 20 occurs, and therefore front-left steered road wheel FL moves into jounce or rebound. That is, up-and-down motion of front-left steered road wheel FL relative to the vehicle body occurs. At this time, impact loads inputted from the uneven road surface to front-left steered road wheel FL can be effectively absorbed by means of strut 10. Due to the oscillating motion of lower arm 20, the angle between axle housing 30 and lower arm 20 tends to slightly change. The angle change can be absorbed by universal joint 40.

(Steering Actuator)

The steering actuator of steering apparatus 1 of the first embodiment is comprised of motor 50 and speed reducer 60. The steering actuator is installed on the upper face of lower arm 20 or installed inside of lower arm 20. Speed reducer 60 includes a parallel gear train comprised of three gears 61-63 whose rotation axes are parallel to each other. First gear 61, second gear 62, and third gear 63 are three different spur gears, which construct a two-stage gear mechanism. First and second gears 61-62 are circular spur gears, whereas third gear 63 is a sector gear. In the shown embodiment, spur gears are used as gears 61-63. In lieu thereof, helical gears may be used as gears 61-63.

It should be noted here that the "face" of lower arm 20 means either one of upper and lower faces of lower arm 20 as viewed in the vehicle vertical direction (in the direction of the vehicle z-axis). The "upper face" of lower arm 20 means the upside of lower arm 20, as viewed from above. The "lower face" of lower arm 20 means the underside of lower arm 20, as viewed from below.

Lower arm 20 has a first case 201 constructing the lower face of lower arm 20 and a second case 202 constructing the upper face of lower arm 20. First case 201 and second case 202 cooperate with each other to provide a speed-reducer casing for speed reducer 60. The speed-reducing gear train of speed reducer 60 is operably accommodated in an internal space R defined by the inner peripheral walls of first and second cases 201-202.

Electric motor 50 is a direct-current (DC) brushless motor. Although it is not clearly shown in the drawings, an electric current sensor and a motor rotation sensor are attached to motor 50, for detecting the magnitude of electric current flow through motor 50 and the rotation angle of an output shaft 51 of motor 50. The electric current sensor and the motor rotation sensor of motor 50 are electrically connected to the input interface circuitry of the steering controller S-ECU. The motor unit, constructing motor 50, is an electric motor unit, generally used in an existing electric-motor-driven power steering system.

Motor 50 is installed and fitted onto the upper face of second case 202. As viewed from above (in the top view of the vehicle), motor 50 is laid out, such that motor 50 and drive shaft DS are not overlapped with each other. Thus, even when lower arm 20 oscillates during suspension stroke, there is no risk that motor 50 comes into contact with drive shaft DS. Output shaft 51 of motor 50 is protruded into the internal space R in a manner so as to be perpendicular to a plane of lower arm 20, that is, a plane through the center A of oscillating motion of lower arm 20 and the center B of the outside end portion of lower arm 20 (substantially corresponding to the center of rotational shaft 631 of third gear 63). First gear 61 is fixedly connected to the tip of output shaft 51, for co-rotation with the motor output shaft.

Second gear 62 is provided in the internal space R in a manner so as to be laid to be laterally outwards offset from output shaft 51 of motor 50. Second gear 62 is rotatably supported by means of a first bearing BRG1 installed in first case 201 and a second bearing BRG2 installed in second case 202. The rotation axis of second gear 62 is laid to be parallel to the rotation axis of output shaft 51 of motor 50. A large-diameter gear 621 and a small-diameter gear 622 are formed integral with the rotational shaft of second gear 62 to provide a two-stage gear configuration. Large-diameter gear 621, located below small-diameter gear 622, is in meshed-engagement with first gear 61.

Third gear 63 is provided in the internal space R and arranged to be laterally outwards offset from second gear 62. Third gear 63 is rotatably supported by means of a third bearing BRG3 installed in first case 201 and a fourth bearing BRG4 installed in second case 202. The rotation axis of third gear 63 is laid to be parallel to the rotation axis of second gear 62. The toothed portion of third gear 63 (the sector gear) is in meshed-engagement with small-diameter gear 622 of second gear 62. As previously described, driving-side yoke 41, whose axis is arranged coaxial with the axis of rotational shaft 631 of third gear 63, is formed integral with the upper face of third gear 63. Driving-side yoke 41 is laid to protrude from the upper face of lower arm 20 through a through hole 207 formed in second case 202.

The speed-reducer casing, constructed by first and second cases 201-202, is provided with a stopper mechanism (i.e., a pair of stopper shoulders) that restricts excessive anticlockwise and clockwise angular displacements of third gear 63 exceeding predetermined angular-displacement limits by way of abutment of the first stopper shoulder with one radially-extending sidewall portion of third gear 63 (the sector gear) and abutment of the second stopper shoulder with the other radially-extending sidewall portion of third gear 63. The previously-discussed predetermined angular-displacement limits are set or determined to be identical to maximum leftward and rightward rotation angles of third gear 63 (the sector gear) under left-turn and right-turn limits. In the first embodiment, third gear 63 is constructed by a sector gear, and therefore it is possible to effectively reduce or shorten the size and dimensions of lower arm 20 in the lateral and longitudinal directions (in the directions of the y-axis and the x-axis of the vehicle). Hence, it is possible to effectively suppress lower arm 20 from being lengthened than necessary, while adequately reducing the motor speed, thereby enabling the compactified SBW system.

The number of revolutions of motor 50 (output shaft 51), simply, the motor speed, is identical to the number of revolutions of first gear 61. The motor speed (output rotation of motor 50) is reduced by a ratio between the number of teeth on large-diameter gear 621 of second gear 62 and the number of teeth on first gear 61, and then the reduced rotation is transmitted to second gear 62 as input rotation. The output rotation of second gear 62 is reduced by a ratio between the converted number of teeth on third gear 63 (based on the assumption that third gear 63 is a circular gear whose external teeth are circumferentially equidistant-spaced from each other and integrally formed around its entire circumference) and the number of teeth on small-diameter gear 622 of second gear 62. The reduced output rotation of second gear 62 is transmitted to third gear 63. Third gear 63 is configured to rotate within angular displacements corresponding to steer angle limits. Thus, it is unnecessary to rotate third gear 63 by an angular displacement of 360 degrees. For the reasons discussed above, the sector gear is used as third gear 63.

In this manner, rotation of motor 50 is reduced by means of the two-stage speed reducer 60 comprised of three gears 61-63, and thus converted into rotary motion of driving-side yoke 41. As is generally known, a speed reduction means a torque multiplication (or a torque increase). Thus, an output torque generated from motor 50 is multiplied in proportion to the speed reduction ratio of the two-stage speed reducer 60, and then the multiplied torque is outputted to driving-side yoke 41. Rotation and torque of driving-side yoke 41 are transferred via spider 43 to driven-side yoke 42, to turn axle housing 30 (in other words, front-left steered road wheel FL) about the kingpin axis (the steering axis). The above-mentioned kingpin axis (the steering axis) serves as a pivot of axle housing 30. That is, axle housing 30 (in other words, front-left steered road wheel FL) is turned by a driving force of motor 50 installed on lower arm 20.

As indicated by the phantom line in FIG. 1, the steering controller S-ECU, which is configured to control motor 50, is installed or mounted on lower arm 20 in close proximity to the motor.

In a similar manner to the front-left steering system configuration as discussed previously, the steering actuator (motor 50 and speed reducer 60) of steering apparatus 1 of the first embodiment is installed on lower arm 20 of the front-right side. That is, the steering actuator (50, 60) is installed on each individual steered road wheel (FL, FR). These left and right steering actuators construct a part of the SBW system.

Operation and Effects of First Embodiment

Steering apparatus 1 of the first embodiment provides the following operation and effects.

(1) Steering apparatus 1 includes axle housing 30 rotatably supporting hub H on which a steered road wheel (front-left or front-right steered road wheel FL, FR) is installed, lower arm 20 adapted to be oscillatingly supported at one end (i.e., the inside end of lower arm 20) on a vehicle body by means of supporting portions 21, 21 corresponding to the inside lower-arm pivots substantially coaxial with each other in the direction of the vehicle x-axis, and having turning portion 23 provided at the other end (i.e., the outside end of lower arm 20) for pivotably supporting axle housing 30 by turning portion 23, and motor 50 installed on lower arm 20 for turning axle housing 30 by a driving force produced by the motor. In the steering apparatus 1 of the first embodiment, the rotation axis of motor 50 (i.e., the axis of motor output shaft 51) and the pivot of axle housing 30 (i.e., the kingpin axis or the steering axis) are arranged to be offset from each other.

As set forth above, in steering apparatus 1 of the first embodiment, constructing a part of the SBW system, motor 50 is installed on lower arm 20, instead of installing the motor on the vehicle body. Thus, there is no risk of undesired interference between the steering actuator (e.g., motor 50) and vehicle-body side component parts (such as engine component parts). Accordingly, it is possible to enhance the system layout flexibility. Additionally, in the case of the previously-noted steering output section of steering apparatus 1 of the first embodiment, by virtue of the layout of the steering actuator (especially, motor 50) on lower arm 20, there is a less change in the positional relationship between the steering actuator (i.e., motor 50) and the suspension-system control arm (i.e., lower arm 20), and as a result any toe change does not occur during suspension stroke. This eliminates the necessity of a new control logic (i.e., additional arithmetic and logical operations), required to compensate for toe changes. Thus, it is possible to simplify the control system configuration of the steering controller S-ECU, thus avoiding the complicated SBW system.

Furthermore, the rotation axis of motor 50 and the pivot of axle housing 30 (that is, the kingpin axis or the steering axis) are arranged to be spaced apart from each other (in the vehicle lateral direction), and thus it is possible to install speed reducer 60 between the rotation axis (motor output shaft 51) of motor 50 and the kingpin axis. Therefore, it is possible to ensure adequate steering torque, while avoiding undesired interference between the steering actuator (e.g., motor 50) and road-wheel side component parts (e.g., wheel hub H or a tire of a steered road wheel (e.g., front-left steered road wheel FL), thus enhancing the saleability. Owing to the previously-noted offset layout of the rotation axis of motor 50 and the kingpin axis, it is possible to reduce a moment of the motor load acting on lower arm 20, thus effectively suppressing an increase in unsprung mass of the vehicle. This effectively avoids the driving stability and riding comfort from being deteriorated, even under a condition where steering actuators are installed on respective lower control arms.

(2) The rotation axis of motor 50 is laterally spaced apart from turning portion 23 and arranged close to the vehicle body. In other words, motor 50 is provided closer to the vehicle body rather than the pivot of axle housing 30 (that is, the kingpin axis).

Therefore, it is possible to certainly prevent undesirable interference between the steering actuator (e.g., motor 50) and road-wheel side component parts (e.g., wheel hub H or a tire of a steered road wheel (e.g., front-left steered road wheel FL). In addition to the above, the distance between the installation position of motor 50 and the axis of oscillating motion of lower arm 20 (that is, the straight line through the axes of supporting portions 21, 21) can be shortened. Owing to the shortened distance between the installation position of motor 50 and the lower-arm pivot (supporting portions 21, 21), it is possible to effectively reduce a moment of the motor load acting on lower arm 20, thereby certainly suppressing an increase in unsprung mass of the vehicle.

(3) Moreover, in the lower-arm-mounted steering actuator incorporated in steering apparatus 1 of the first embodiment, speed reducer 60, which is configured to reduce rotation produced by motor 50 and multiply torque generated from the motor, is provided. Speed reducer 60 is installed on lower arm 20 and located between the rotation axis of motor 50 and turning portion 23. In other words, the steering actuator is arranged on the suspension-system lower arm, such that motor 50 and speed reducer 60 are arranged from the vehicle body side, in that order.

In comparison with a so-called coaxial layout in which the rotation axis of an electric motor and an output shaft of a speed reducer are arranged coaxial with each other, in the case of an offset layout (or a parallel layout) of steering apparatus 1 of the first embodiment in which the rotation axis of motor 50, the rotation axis of second gear 62, and the rotation axis (rotation shaft 631) of third gear 63 are parallel to and offset from each other, it is possible to downsize the motor unit itself. In the case of the parallel layout, the axial length of the motor unit can be reduced, as compared to the coaxial layout. Especially, in the case of the parallel layout, an adequate installation space (packaging space), required for installing speed reducer 60 on lower arm 20, can be defined between the rotation axis of motor 50 and turning portion 23. Thus, even when utilizing the downsized electric motor whose output torque is small, it is possible to certainly produce a required steering torque by way of speed reducer 60 having an adequately high reduction ratio. Furthermore, motor 50 and speed reducer 60 are installed on lower arm 20 but integrated with each other on lower arm 20. More concretely, speed reducer 60 is accommodated in the internal space R defined between first and second cases 201-202 (upper and lower halves) constructing lower arm 20, and additionally motor 50 is installed and fitted onto the upper face of second case 202. That is, lower arm 20 and the steering actuator (motor 50 and speed reducer 60) can be handled or utilized as a unit. Thus, it is possible to enhance the saleability of the steering apparatus of the SBW system.

(4) In steering apparatus 1 of the first embodiment shown in FIG. 1, a parallel gear train comprised of three gears 61-63 whose rotation axes are parallel to each other, is used as a speed reducer. In lieu thereof, a harmonic-drive speed reducer (strain-wave gearing) may be used to reduce rotation of motor 50 at high ratios.

As is generally known, the harmonic-drive speed reducer is based on a principle called "strain-wave gearing". The harmonic-drive speed reducer is comprised of three basic elements, namely, an ellipse-shaped wave generator, a flexible flexspline, and a rigid circular spline, all arranged concentric with each other. Such a harmonic-drive speed reducer has the following several advantages.

First, the harmonic-drive speed reducer can realize a comparatively high speed reduction ratio. Furthermore, a concentric shaft arrangement (concentric shaft geometry) of the harmonic-drive speed reducer that input and output shafts have the same centerline, contributes to a compact form factor. Moreover, the harmonic-drive speed reducer has a high rotational accuracy, because of its ability to position moving elements precisely. For instance, suppose that such a harmonic-drive speed reducer is integrally connected to motor 50 such that the input shaft of the harmonic-drive speed reducer is arranged coaxial with the rotation axis (output shaft 51) of motor 50. The harmonic-drive speed reducer serves as a high-performance speed reducer that accurately reduces rotation of motor output shaft 51 with a high mechanical efficiency. As set forth above, in steering apparatus 1 of the first embodiment, the rotation axis of motor 50 is arranged to be offset from the pivot of axle housing 30 (i.e., the kingpin axis or the steering axis), and thus an additional speed reducer can be further provided between the rotation axis of motor 50 and the kingpin axis. Because of the use of these two speed reducers, output rotation of motor 50 is, first, reduced by means of the harmonic-drive speed reducer, and then the reduced rotation can be further reduced by means of the additional speed reducer (e.g., speed reducer 60 as shown in FIG. 1). In such a case (in the two speed reducers combined with each other), it is possible to provide a very high reduction ratio (in other words, adequate steering torque), while simplifying the configuration of the additional speed reducer (e.g., speed reducer 60 as shown in FIG. 1) provided between the rotation axis of motor 50 and the kingpin axis. Although the previously-discussed modification is exemplified in the coaxial layout of the input shaft of the harmonic-drive speed reducer and motor output shaft 51, a so-called offset arrangement may be utilized or accepted as a high-reduction-ratio speed changer. In the case of the offset arrangement, the input shaft of the harmonic-drive speed reducer is arranged to be offset laterally from the rotation axis of motor 50, and thus it is possible to further downsize the motor unit itself.

(5) Turning portion 23 is mechanically linked via universal joint 40 to axle housing 30.

That is, universal joint 40 is configured to pivotably join or connect axle housing 30 to lower arm 20, while permitting torque transmission from the steering actuator (driving-side yoke 41 of turning portion 23) to axle housing 30 (driven-side yoke 42 of second arm 33), for realizing a steering function. That is, universal joint 40 (exactly, the center of universal joint 40) serves as a lower outer pivot of the steered road wheel (e.g., front-left steered road wheel FL). Universal joint 40 is also configured to join or connect axle housing 30 and lower arm 20, in a manner so as to permit a vertical oscillating motion (jounce or rebound) of the steered road wheel (e.g., front-left steered road wheel FL) with respect to the vehicle body, for realizing a suspension function. Therefore, by means of a simple linkage structure (i.e., only one universal joint 40), it is possible to reconcile both the smooth steering function and the smooth suspending function.

(6) Motor 50 is installed on the upside of lower arm 20.

Therefore, as compared to a lower-arm-underside-mounted steering actuator in which an electric motor is installed on the underside of the lower arm, in the case of the lower-arm-upside-mounted steering actuator (see FIG. 1) in which motor 50 is installed on the upside of lower arm 20, it is possible to certainly prevent motor 50 (an electronically-controlled precision mechanical instrument) from being damaged due to obstacles on the road surface, while certainly avoiding undesired interference between the steering actuator and the obstacles during driving of the vehicle. Additionally, owing to the offset layout of steering apparatus 1 in which motor 50 and speed reducer 60 are installed on lower arm 20 but integrated with each other on the same lower arm 20, it is possible to downsize the motor unit itself. Because of the downsized motor unit, even when motor 50 is installed on the upside of lower arm 20 on front-wheel-drive vehicles, it is possible to prevent undesired interference between drive shaft DS and motor 50.

(7) A pair of steering actuators, each of which is comprised of motor 50 and speed reducer 60, are installed for respective steered road wheels (e.g., front-left and front-right steered road wheels FL-FR).

Therefore, it is possible to enhance the layout flexibility and the design flexibility of several devices constructing the automotive SBW vehicle steering system. It is possible to realize the totally downsized and compactified steering system configuration. Furthermore, left and right steered road wheels (e.g., front-left and front-right steered road wheels FL-FR) can be steered independently of each other by means of respective steering actuators, thereby enhancing the maneuverability of the vehicle. Moreover, it is possible to supply a combined unit, which is produced by combining a suspension-system component part (i.e., lower arm 20) with a steering-system component part (i.e., the steering actuator incorporated in steering apparatus 1 and comprised of motor 50 and speed reducer 60), as a subassembly for each steered road wheel (for each of steered front road wheels FL-FR). This contributes to the further enhanced saleability.

Moreover, a fail-safe mechanism (or a back-up system) may be further added, so as to execute a back-up operating mode at which a pair of steering actuators are mechanically coupled to each other via the back-up system (e.g., a back-up cable) in the presence of an SBW system failure (e.g., in the presence of a steering actuator failure). By the provision of such a back-up system, even when one of the left and right steering actuators becomes failed, part of steering torque generated from the other unfailed steering actuator can be transmitted via the back-up cable to the failed steering actuator, for properly steering each of the steered road wheels (front steered road wheels FL-FR).

(8) Additionally, steering controller S-ECU, which is configured to electronically control electric motor 50, is installed on lower arm 20 on which motor 50 is installed.

Therefore, it is possible to supply a combined unit, which is produced by combining a suspension-system component part (i.e., lower arm 20), a steering-system component part (i.e., the steering actuator incorporated in steering apparatus 1 and comprised of motor 50 and speed reducer 60), and steering controller S-ECU with each other, as a subassembly for each steered road wheel (for each of steered front road wheels FL-FR). This contributes to the more-improved saleability.

Second Embodiment

Figure 2:
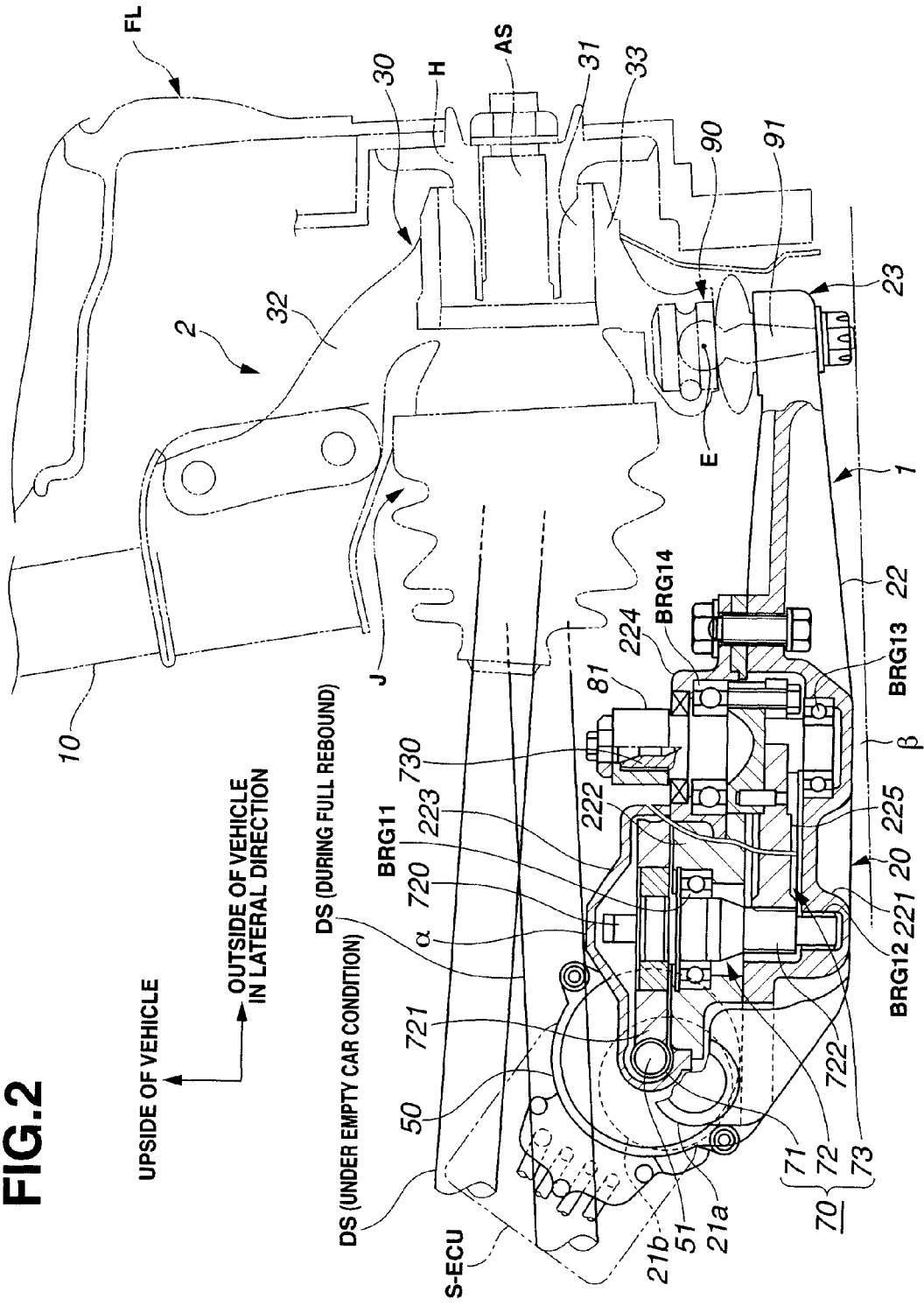
FIG. 2 is a partial cross-sectional view illustrating a second embodiment of an automotive vehicle steering apparatus (only the front-left side), taken along the line C-C in FIG. 3, as viewed from the front face of the vehicle.
Figure 3:
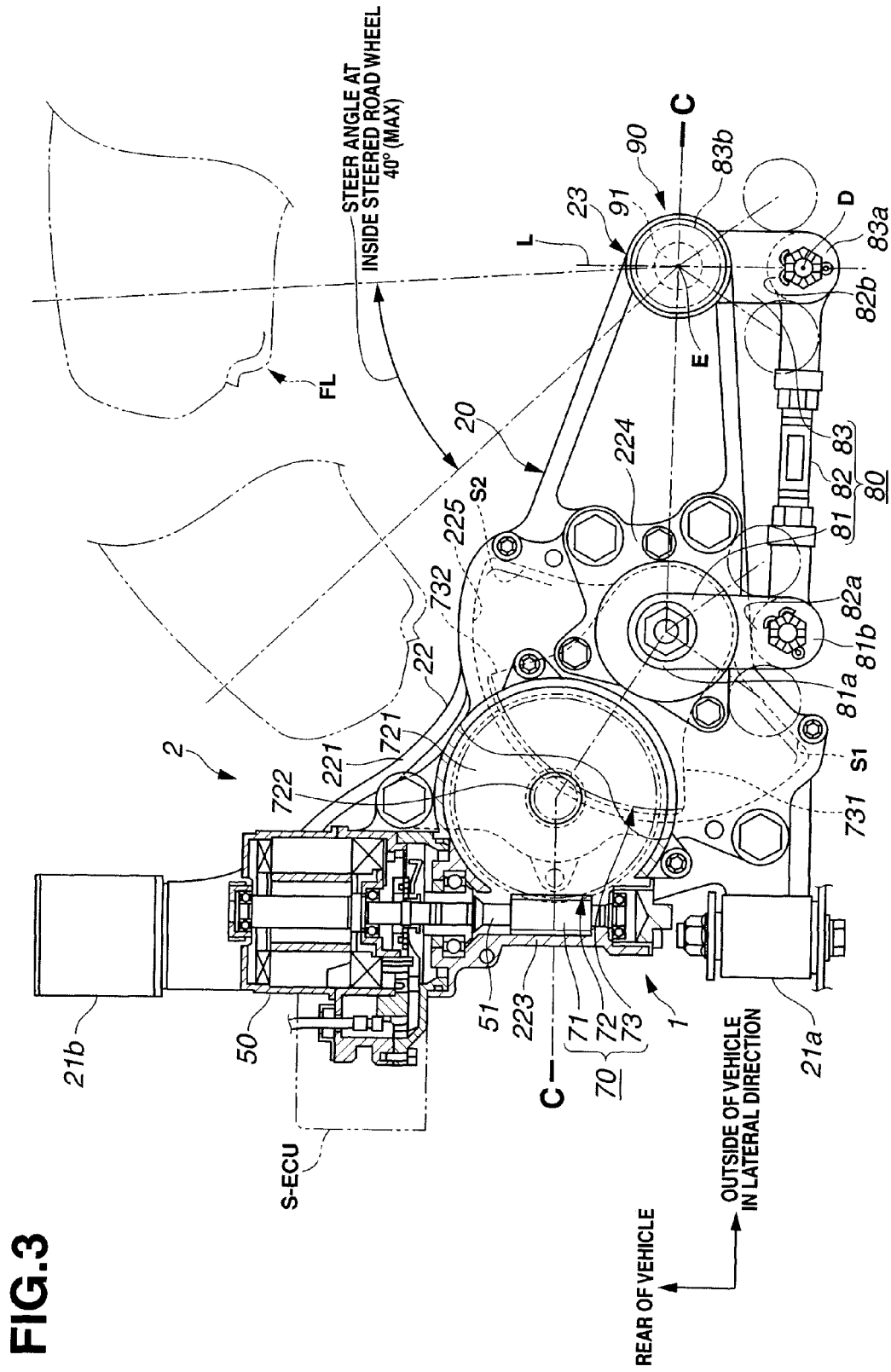
FIG. 3 is a partial cross-sectional view illustrating the steering apparatus (only the front-left side) of the second embodiment, as viewed from the upside of the vehicle.

Referring now to FIGS. 2-3, there is shown the steering apparatus 1 of the second embodiment. In a similar manner to the first embodiment of FIG. 1, steering apparatus 1 of the second embodiment is also applied to a steer-by-wire (SBW) system of an automotive vehicle, in which front-left and front-right steered road wheels FL, FR, each rotatably supported by suspension system 2, are steered independently of each other by driving forces produced by respective steering actuators, each comprised of electric motor 50, a speed reducer denoted by reference sign 70, and a link mechanism denoted by reference sign 80.

(Steering System Configuration)

Steering apparatus 1 of the second embodiment is hereunder described in detail in reference to FIGS. 2-3. In explaining the second embodiment, for the purpose of simplification of the disclosure, the same reference signs used to designate elements in the first embodiment will be applied to the corresponding elements used in the second embodiment, while detailed description of the same reference signs will be omitted because the above description thereon seems to be self-explanatory. Note that FIG. 2 shows the partial cross-sectional view of only the front-left side of steering apparatus 1 of the second embodiment, when viewed from the front face of the vehicle, and the partial cross section of FIG. 2 is taken along the line C-C in FIG. 3. On the other hand, FIG. 3 shows the partial cross-section of steering apparatus 1 of the second embodiment, when viewed from the upside of the vehicle. In FIG. 2, a part of link mechanism 80 is omitted, whereas in FIG. 3 strut 10, drive shaft DS, axle housing 30, wheel bearing 31, and wheel hub H, and the like are omitted. In a similar manner to the first embodiment, suspension system 2 shown in FIGS. 2-3 is a strut type suspension system with strut 10 employing both a coil spring and a shock absorber.

Lower arm 20 shown in FIGS. 2-3 is a Γ-shaped lower control arm, which is generally used as a strut-type front suspension system. Lower arm 20 is pivotally or oscillatingly supported on the vehicle body by means of two lower-arm pivots, corresponding to "supporting portions" denoted by reference signs 21a, 21b in FIG. 3. The structures of supporting portions 21a-21b of FIG. 3 are identical to those of supporting portions 21, 21 of the first embodiment shown in FIG. 1.

As viewed from the upside of the vehicle, that is, in the longitudinal direction of the vehicle, turning portion 23 of lower arm 20 is located at almost the same position as axle shaft AS (i.e., the rotation axis of front-left steered road wheel FL). Additionally, turning portion 23 of lower arm 20 is arranged closer to the front supporting portion 21a rather than the rear supporting portion 21b. Second arm 33 of axle housing 30 is linked via a ball joint 90 to turning portion 23. In the second embodiment, ball joint 90 has the same structure as a typical road-wheel side control-arm supporting portion generally applied to a typical Γ-shaped lower control arm not employing a steering actuator. Also, ball joint 90 is linked to the road wheel side (axle housing 30) at the same installation position as the typical road-wheel side control-arm supporting portion. The axis of a ball stud 91 of ball joint 90 is arranged to extend substantially in the vertical direction (in the direction of the vehicle z-axis). Ball joint 90 serves to absorb an angle change between axle housing 30 and lower arm 20, occurring due to oscillating motion of lower arm 20.

Speed reducer 70 is installed on the inside end portion of lower arm 20 in the lateral direction (in the direction of the vehicle y-axis). Concretely, three gears 71-73, constructing speed reducer 70, are built in arm portion 22 of lower arm 20. On the other hand, link mechanism 80 is installed on the outside of lower arm 20 in the lateral direction (in the direction of the vehicle y-axis). Concretely, a plurality of arms and rods, constructing link mechanism 80, are mounted on arm portion 22 of lower arm 20 (see FIG. 3). Link mechanism 80 is provided to transmit rotation reduced by speed reducer 70 and torque multiplied by speed reducer 70 via turning portion 23 to second arm 33 of axle housing 30. As a result of this, second arm 33 turns or pivots. That is, lower arm 20 pivotably supports axle housing 30 by means of turning portion 23. Ball joint 90 serves as a lower outer pivot of front-left steered road wheel FL. On the other hand, the installation point of the upper end of strut 10 to the vehicle body serves as an upper outer pivot of front-left steered road wheel FL. Therefore, the straight line, linking the installation point of the upper end of strut 10 to the vehicle body (i.e., the upper outer pivot) and ball joint 90 (i.e., the lower outer pivot), corresponds to a kingpin axis (i.e., a steering axis) of front-left steered road wheel FL.

(Steering Actuator)

The steering actuator of steering apparatus 1 of the second embodiment is comprised of motor 50, speed reducer 70, and link mechanism 80. The steering actuator is installed on the upper face of lower arm 20 or the side face of lower arm 20, or installed inside of lower arm 20. In a similar manner to the first embodiment, an indicated by the phantom line in FIGS. 2-3 the steering controller S-ECU, which is configured to control motor 50, is installed or mounted on lower arm 20 in close proximity to the motor.

Lower arm 20 has a first case 221 constructing the lower face of lower arm 20, a second case 222 installed on the upper face of the first case 221, and third and fourth cases 223-224 installed on the upper face of the second case 222. These four cases 221-224 cooperate with each other to provide a speed-reducer casing for speed reducer 70.

Speed reducer 70 is constructed by a two-stage gear mechanism using a worm gear system. First gear 71 is a worm gear, second gear 72 is a worm wheel (a large-diameter gear 721), and third gear 73 is a sector gear.

In a similar manner to the first embodiment, in steering apparatus 1 of the second embodiment, electric motor 50 is a direct-current (DC) brushless motor. The rotation axis of motor 50 is arranged along the axes of two rubber-bushed supporting portions 21a, 21b, which axes are arranged substantially coaxial with each other in their longitudinal directions (in the direction of the vehicle x-axis). Thus, the straight line, linking the axes of two rubber-bushed supporting portions 21a, 21b, and the rotation axis (motor output shaft 51) of motor 50 are arranged substantially parallel to each other. Additionally, motor 50 is laterally spaced apart from turning portion 23 and arranged close to the axis of oscillating motion of lower arm 20 (that is, the straight line through the axes of supporting portions 21a-21b). More concretely, motor 50 is installed on the upper face of first case 221 and located between front and rear supporting portions 21a-21b and arranged closer to the rear supporting portion 21b rather than the front supporting portion 21a.

Output shaft 51 of motor 50 is accommodated in third case 223. First gear 71 is fixedly connected to the tip of output shaft 51, for co-rotation with the motor output shaft. Second gear 72 is provided in third case 223 and arranged to be laterally outwards offset from motor output shaft 51. Second gear 72 is rotatably supported by means of a bearing BRG11 installed in second case 222 and a bearing BRG12 installed in first case 221. The rotation axis (a rotational shaft 720) of second gear 72 is arranged to extend in the vertical direction (in the direction of the vehicle z-axis) perpendicularly to a plane of lower arm 20, and laid to be laterally outwards offset from motor output shaft 51. Large-diameter gear 721 (the worm wheel) and a small-diameter spur gear 722 are formed integral with rotational shaft 720 of second gear 72 to provide a two-stage gear configuration. Large-diameter gear 721 (the worm wheel), located above small-diameter spur gear 722, is in meshed-engagement with first gear 71 (the worm gear)

Third gear 73 is installed on the outside of second gear 72 in the lateral direction (in the direction of the vehicle y-axis). Third gear 73 is rotatably supported by means of a bearing BRG13 installed in first case 221 and a bearing BRG14 installed in fourth case 224. The rotation axis (a rotational shaft 730) of third gear 73 is arranged in parallel with the rotation axis (rotational shaft 720) of second gear 72. The toothed portion of third gear 73 (the sector gear) is in meshed-engagement with small-diameter gear 722 of second gear 72.

The rotation axis (rotational shaft 730) of third gear 73 is arranged to protrude upwards from the upper face of lower arm 20, while penetrating second and fourth cases 222 and 224.

A third-gear housing section 225 of first case 221, in which third gear 73 (the sector gear) is accommodated, is formed into a sector. A pair of radially-extending sidewall portions S1, S2 of third-gear housing section 225 serve as respective stopper shoulders (a stopper mechanism). An excessive anticlockwise angular displacement (viewing FIG. 3) of third gear 73 exceeding a predetermined anticlockwise angular-displacement limit is restricted by way of abutment of a first one S1 of the two stopper shoulders (S1, S2) with one radially-extending sidewall portion 731 of third gear 73 (the sector gear). In a similar manner, an excessive clockwise angular displacement (viewing FIG. 3) of third gear 73 exceeding a predetermined clockwise angular-displacement limit is restricted by way of abutment of the second stopper shoulder S2 with the other radially-extending sidewall portion 732 of third gear 73. The upside view of FIG. 3 shows the neutral position of third gear 73 at which the steer angle of steered front-left road wheel FL is "0". As discussed above, third-gear housing section 225, in which third gear 73 (the sector gear) is accommodated, is provided with a stopper mechanism (first and second stopper shoulders S1-S2) that restricts excessive anticlockwise and clockwise angular displacements of third gear 73 exceeding the predetermined angular-displacement limits. The previously-discussed predetermined angular-displacement limits are set or determined to be identical to maximum leftward and rightward rotation angles of third gear 73 (the sector gear) under left-turn and right-turn limits.

With the previously-discussed speed reducer 70, rotation of motor 50 is reduced by means of the two-stage speed reducer 70, and then the reduced speed is transmitted to third gear 73. At the same time, an output torque generated from motor 50 is multiplied in proportion to the speed reduction ratio of the two-stage speed reducer 70, and then the multiplied torque is outputted to third gear 73. Rotation and torque of third gear 73 are transferred via link mechanism 80 to second arm 33 of axle housing 30, to turn axle housing 30 (in other words, front-left steered road wheel FL) about the kingpin axis (the steering axis). That is, axle housing 30 (in other words, front-left steered road wheel FL) is turned by a driving force of motor 50 installed on lower arm 20.

In the same manner as the first embodiment, in the steering apparatus of the second embodiment, third gear 73 is constructed by a sector gear, and thus third-gear housing section 225, in which third gear 73 (the sector gear) is accommodated, can be shaped into a sector form, which is configured to be substantially conformable to the outline of the sector gear (third gear 73), fully taking into account the operating range (or the working area) of the sector gear. Therefore, it is possible to effectively reduce or shorten the size and dimensions of lower arm 20 in the lateral and longitudinal directions (in the directions of the y-axis and the x-axis of the vehicle). Hence, it is possible to suppress lower arm 20 from being lengthened than necessary, while adequately reducing the motor speed, thereby enabling the compactified SBW system.

Additionally, motor 50 is installed on the upper face of first case 211, such that the projected area of the front face of motor 50 becomes minimum, when viewed in the longitudinal direction (in the direction of the vehicle x-axis). Thus, there is no risk of undesired interference between motor 50 and vehicle-body side component parts (such as engine component parts), thereby avoiding the layout flexibility from lowering. Furthermore, motor 50 is installed between front and rear supporting portions 21a-21b and arranged closer to the rear supporting portion 21b rather than the front supporting portion 21a. As viewed from above (in the top view of the vehicle), motor 50 is laid out, such that motor 50 and drive shaft DS are not overlapped with each other. Thus, even when lower arm 20 oscillates during suspension stroke, there is no risk that motor 50 comes into contact with drive shaft DS.

In addition to the above, as seen in FIG. 2, the positional relationship between the speed-reducer casing (especially, third case 223) and drive shaft DS is configured or designed, such that a clearance space α is ensured or defined between the uppermost face of lower arm 20 (that is, the top face of third case 223) and the lowermost end of drive shaft DS during full rebound of the suspension-system control arm. Hence, even when lower arm 20 is oscillating during suspension stroke, there is no risk that the upper end of lower arm 20 (exactly, the top face of third case 223) comes into contact with drive shaft DS.

Moreover, as seen in FIG. 2, the positional relationship between the speed-reducer casing (especially, first case 221) and turning portion 23 of lower arm 20 is configured or designed, such that a clearance space β is ensured or defined between the lowermost face of the inside end portion of lower arm 20 (that is, the lowermost face of first case 221) and the horizontal plane passing through the lowermost end of turning portion 23. That is to say, the lowermost end face of lower arm 20 is configured or designed not to protrude downwards than necessary, and thus there is no risk of undesired interference between lower arm 20 and obstacles on the road surface.

Link mechanism 80 has the same structure as a typical steering-output linkage (e.g., rack-and-pinion steering gear) generally applied to a typical steering system differing from a steer-by-wire system. In the second embodiment, link mechanism 80 is comprised of a pitman arm 81, a tie rod 82, and a steering knuckle arm 83. Link mechanism 80 serves to convert rotary motion reduced by speed reducer 70 (that is, output rotation of third gear 73) into pivoting motion of axle housing 30 via turning portion 23.

One end 81a of pitman arm 81 is integrally (fixedly) connected to the tip of third-gear rotational shaft 730, which tip protrudes upwards from the upper face of lower arm 20. As can be seen in FIG. 3, in the neutral state where the steer angle of steered front-left road wheel FL is "0", pitman arm 81 is arranged along the longitudinal direction (in the direction of the vehicle x-axis), such that the neutral axis of pitman arm 81 is arranged parallel with the longitudinal direction. Pitman arm 81 is pivotable about the end 81a (the center of oscillating or pivoting motion of pitman arm 81). The other end 81b of pitman arm 81 is linked via a ball joint to one end 82a of tie rod 82.

Tie rod 82 is arranged in the lateral direction (in the vehicle y-axis). The other end 82b of tie rod 82 is linked via a ball joint to one end 83a of knuckle arm 83.

In a similar manner to pitman arm 81, in the neutral state shown in FIG. 3, where the steer angle of steered front-left road wheel FL is "0", knuckle arm 83 is arranged along the longitudinal direction (in the direction of the vehicle x-axis). The other end 83b of knuckle arm 83 is integrally (fixedly) connected to second arm 33 of axle housing 30.

The longitudinal length of knuckle arm 83 is dimensioned to be substantially identical to that of pitman arm 81. The first end 81a of pitman arm 81 and the second end 83b of knuckle arm 83 are arranged at almost the same position in the longitudinal direction (the vehicle x-axis direction). Additionally, the straight line L through (i) the rotation center of the turning pair of the second end 82b of tie rod 82 and the first end 83a of knuckle arm 83 (that is, the rotation center D of the ball joint linking tie rod 82 and knuckle arm 83) and (ii) the rotation center of the turning pair of turning portion 23 of lower arm 20 and second arm 33 of axle housing 30 (that is, the rotation center E of ball joint 90 linking turning portion 23 and second arm 33), is arranged substantially parallel to the pivot of oscillating motion (pivoting motion) of lower arm 20.

The operation of link mechanism 80 is hereunder described in detail. Pitman arm 81 pivots or oscillates by way of rotary motion of third gear 73. In other words, the rotary motion of third gear 73 is translated into an oscillating motion of pitman arm 81. The oscillating motion of pitman arm 81 is translated into a displacement of tie rod 82 in the lateral direction (in the direction of the vehicle y-axis). The lateral displacement of tie rod 82 is translated into an oscillating motion of knuckle arm 83. The oscillating motion of knuckle arm 83 is translated into a pivoting motion (or a turning motion) of second arm 33 of axle housing 30, which is integrally (fixedly) connected to knuckle arm 83. Ball joint 90 serves as the center of the turning motion of second arm 33 with respect to lower arm 20. On the assumption that front-left steered road wheel FL is an inside steered road wheel, a maximum angle of the turning motion of second arm 33, measured from the previously-noted neutral state (zero average steer angle), that is, a maximum steer angle (an angular-displacement limit value) at the inside steered road wheel is set to become approximately 40 degrees (see FIG. 3).

In a similar manner to the front-left steering system configuration as discussed previously, the steering actuator (motor 50, speed reducer 70, and link mechanism 80) of steering apparatus 1 of the second embodiment is installed on lower arm 20 of the front-right side. That is, the steering actuator (50, 70, 80) is installed on each individual steered road wheel (FL, FR). These left and right steering actuators construct a part of the SBW system.

Operation and Effects of Second Embodiment

Steering apparatus 1 of the second embodiment provides the following operation and effects.

In addition to the steering system configurations (1), (2), (3), (6), and (7) and their operation and effects of the steering apparatus of the first embodiment, the steering apparatus of the second embodiment can further provide the following operation and effects by system configurations (9), (10), (11), (12), and (13).

(9) Lower arm 20 is pivotally supported on the vehicle body by means of two supporting portions 21a, 21b spaced apart from each other, and additionally motor 50 is installed between these supporting portions 21a, 21b.

As set forth above, motor 50, which serves as a major heavy load of the steering actuator, is arranged in close proximity to the pivot of oscillating motion (pivoting motion) of lower arm 20 (that is, the straight line through two supporting portions 21a, 21b). Thus, the distance between the installation position of motor 50 and the pivot (the center of oscillating motion) of lower arm 20 can be remarkably shortened. As a result of this, it is possible to greatly reduce a moment of the motor load acting on lower arm 20 down to approximately a zero moment, thus certainly suppressing an increase in unsprung mass of the vehicle.

(10) The rotation axis of motor 50 (i.e., motor output shaft 51) is arranged along the axes of supporting portions 21a-21b, pivotably or oscillatingly supporting lower arm 20, which axes are arranged substantially coaxial with each other in the direction of the vehicle x-axis and serve as pivots for lower arm 20. Speed reducer 70 is constructed by a worm gear system (a worm gearing speed reducer) having a worm gear (first gear 71) and a worm wheel (second gear 72).

Such a worm gearing speed reducer can provide a very high speed reduction ratio. Additionally, the rotation axis of motor 50 (motor output shaft 51) is arranged along the lower-arm pivots (supporting portions 21a-21b) arranged substantially coaxial with each other in the direction of the vehicle x-axis, and therefore the projected area of the front face of motor 50 becomes minimum. Thus, there is no risk of undesired interference between motor 50 and vehicle-body side component parts (such as engine component parts), thereby avoiding the layout flexibility from lowering. Furthermore, both faces of the worm wheel (second gear 72) are arranged parallel to the horizontal plane, thereby suppressing the vertical dimension of lower arm 20 from undesirably lengthening. Because of the previously-noted horizontal layout of the worm wheel (that is, the suppressed or reduced vertical dimension of lower arm 20), it is possible to ensure a clearance space $\alpha$ between the uppermost face of the top face of third case 223 of lower arm 20 and the lowermost end of drive shaft DS during full rebound of the suspension-system control arm, thereby preventing the upper end of lower arm 20 (the top face of third case 223) from coming into contact with drive shaft DS during suspension stroke. Moreover, because of the suppressed or reduced vertical dimension of lower arm 20, it is possible to ensure a clearance space $\beta$ between the lowermost face of first case 221 of lower arm 20 and the horizontal plane passing through the lowermost end of turning portion 23, thereby preventing the lower end of lower arm 20 from coming into contact with obstacles on the road surface, during driving of the vehicle. Therefore, in addition to the aforementioned effects obtained by the system configuration (9), it is possible to ensure a very high speed reduction ratio without sacrificing the essential suspension function of the suspension system.

(11) Speed reducer 70 is accommodated in the speed-reducer casing (first to fourth cases 221-224) and has a sector gear (third gear 73). The speed-reducer casing (especially, third-gear housing section 225 of first case 221) is provided with a stopper mechanism S1-S2 that restricts excessive anti-clockwise and clockwise angular displacements of the sector gear (third gear 73) exceeding predetermined angular-displacement limits.

By utilizing a sector gear as the third gear 73, constructing a part of speed reducer 70, third-gear housing section 225 of first case 221 of lower arm 20 can be shaped into a sector form, which is configured to be substantially conformable to the outline of the sector gear (third gear 73), fully taking into account the operating range (or the working area) of the sector gear. Therefore, it is possible to effectively reduce or shorten the size and dimensions of lower arm 20 in the lateral and longitudinal directions (in the directions of the y-axis and the x-axis of the vehicle). Hence, it is possible to reconcile both the adequately reduced motor speed and the properly down-sized lower arm 20, thereby enabling the compactified SBW system. Furthermore, third-gear housing section 225 of first case 221 is provided with a stopper mechanism S1-S2 that restricts excessive anticlockwise and clockwise angular displacements of the sector gear (third gear 73) exceeding predetermined angular-displacement limits. The aforementioned predetermined angular-displacement limits are set or determined to be identical to maximum leftward and rightward rotation angles of third gear 73 (the sector gear) under left-turn and right-turn limits. That is, speed reducer 70 has a speed-reducing function, and also has a stopper function that mechanically sets leftward and rightward steer angle limits.

This eliminates the necessity of an additional stopper device, thus ensuring reduced number of system component parts and enhanced fail-safe function and lower system installation time and costs.

In the speed reducer 70 employed in steering apparatus 1 of the second embodiment described previously in reference to FIGS. 2-3, speed reducer 70 is constructed by three gears, namely, the worm gear (first gear 71), the worm wheel (second gear 72), and the sector gear (third gear 73). In lieu thereof, third gear 73 may be used as a worm sector. In such a case, second gear 72 (the worm wheel) is omitted and third gear 73 (the worm sector) is kept directly in meshed-engagement with first gear 71. The modification contributes to more-reduced number of system component parts and enhanced fail-safe function and lower system installation time and costs.

(12) Also provided as link mechanism 80 employed in steering apparatus 1 of the second embodiment are tie rod 82 displaceable in the lateral direction (in the direction of the vehicle y-axis) responsively to rotary motion of motor 50, and knuckle arm 83 integrally (fixedly) connected to axle housing 30 and mechanically linked to tie rod 82. Additionally, the straight line L passing through (i) the rotation center of the turning pair of tie rod 82 and knuckle arm 83 (that is, the rotation center D of the ball joint linking tie rod 82 and knuckle arm 83) and (ii) the rotation center of the turning pair of lower arm 20 and axle housing 30 (that is, the rotation center E of ball joint 90 linking lower arm 20 and axle housing 30), is arranged substantially parallel to the pivot of oscillating motion (pivoting motion) of lower arm 20.

By the provision of link mechanism 80 having tie rod 82 and knuckle arm 83, it is unnecessary to mount speed reducer 70 on the outside end of lower arm 20. In other words, it is possible to remarkably shorten the distance between the pivot of oscillating motion of lower arm 20 and the installation position of speed reducer 70 (especially, motor 50). As a result of this, it is possible to greatly reduce a moment of the load acting on speed reducer 70 down to a minimum, thus certainly suppressing an increase in unsprung mass of the vehicle.

Furthermore, in the neutral position where the steer angle of a steered road wheel (e.g., steered front-left road wheel FL) is "0", the angle between tie rod 82 and knuckle arm 83 becomes approximately a right angle (90 degrees). Even when tie rod 82 displaces from its neutral state leftwards or rightwards, a moment of force inputted from tie rod 82 to knuckle arm 83 becomes maximum. There is no deviation between (i) the change in angular displacement (clockwise displacement in FIG. 3) of knuckle arm 83 per unit inward displacement of tie rod 82 and (ii) the change in angular displacement (anticlockwise displacement in FIG. 3) of knuckle arm 83 per unit outward displacement of tie rod 82. For the reasons discussed above, such a linkage layout enables stable steer angle control as well as efficient torque transmit from speed reducer 70 to axle housing 30. This contributes to the downsized speed reducer (the downsized motor). This also contributes to the more-simplified steering control logic.

Moreover, the inside end of tie rod 82 is installed on lower arm 20 (exactly, linked to pitman arm 81 installed on lower arm 20). By virtue of the installation of tie rod 82 on lower arm 82, there is a less change in the positional relationship between tie rod 82 and the suspension-system control arm (i.e., lower arm 20), and as a result any toe change does not occur during suspension stroke. Thus, the previously-discussed system configuration (12) of steering apparatus 1 of the second embodiment, in which the steering actuator (motor 50 and speed reducer 70) is linked via link mechanism 80 to axle housing 30, can provide the same effects as the system configurations (1), (2), (3), (6) and (7) of steering apparatus 1 of the first embodiment.

(13) In steering apparatus 1 of the second embodiment shown in FIGS. 2-3, a two-stage worm-gearing speed reducer comprised of first gear 71 (the worm gear), second gear 72 (the worm wheel), and third gear 73 (the sector gear), is used as a speed reducer. In lieu thereof, a harmonic-drive speed reducer (strain-wave gearing) may be used to reduce rotation of motor 50 at high ratios.

In such a case, the worm gearing, composed of first gear 71 (the worm gear) and second gear 72 (the worm wheel), is omitted. In lieu thereof, a harmonic-drive speed reducer is integrally connected to motor 50 such that the input shaft of the harmonic-drive speed reducer is arranged coaxial with the rotation axis (output shaft 51) of motor 50. Additionally, the sub-assembly of motor 50 and the harmonic-drive speed reducer is installed on the upper face of lower arm 20, such that rotational shaft 720 of second gear 72 is replaced with the output shaft of the harmonic-drive speed reducer, and that a gear, fixedly connected to the output shaft of the harmonic-drive speed reducer, is kept in meshed-engagement with third gear 73 (the sector gear). Such a harmonic-drive speed reducer contributes to a compact form factor and more-simplified speed reducer configuration. When installing the sub-assembly of motor 50 and the harmonic-drive speed reducer on lower arm 20, the installation position of motor 50 must be properly adjusted in the vehicle longitudinal direction, so as to avoid undesirable interference between drive shaft DS and motor 50. In the case of application of the harmonic-drive speed reducer equipped steering actuator to a front steered road wheel of a rear-wheel-drive vehicle, it is possible to easily optimize or determine the installation position of motor 50 without any interference between drive shaft DS and motor 50.

[Modifications]

In the shown embodiments, steering apparatus 1 is applied to a MacPherson strut-type suspension system. Steering apparatus 1 may be applied to the other type of suspension systems, for example, a double-wishbone type suspension system using two lateral control arms (upper and lower control arms), or a short-long arm (SLA) suspension system using an upper short-length control arm/link (e.g., an A-shaped arm or a lateral link) and a lower long-length control arm (e.g., an A-shaped arm). That is, the steering apparatus 1 of the shown embodiment can be applied to any types of suspension systems employing at least a lower suspension-system control arm.

In the first embodiment (see FIG. 1), a Hooke's joint is used as universal joint 40, which mechanically links turning portion 23 of lower arm 20 to axle housing 30. Instead of using such a Hooke's joint (a very simple universal joint), another type of universal joint may be used. For instance, turning portion 23 of lower arm 20 may be linked to axle housing 30 via a constant-velocity universal joint that transmits power at constant angular velocity from the driving to the driven shaft.

In the second embodiment (see FIGS. 2-3), tie rod 82 (link mechanism 80) is arranged just forward of lower arm 20. In lieu thereof, tie rod 82 (link mechanism 80) may be arranged just backward of lower arm 20. On the other hand, the positional relationship between tie rod 82 and lower arm 20 in the vehicle vertical direction can be suitably set or configured.

The entire contents of Japanese Patent Application No. 2007-220691 (filed Aug. 28, 2007) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A steering apparatus, comprising:
an axle housing rotatably supporting a wheel hub on which a steered road wheel is installed;
a lower arm adapted to be oscillatingly supported at one end on a vehicle body and having a turning portion provided at the other end for pivotably supporting the axle housing by the turning portion;
an electric motor installed on the lower arm for turning the axle housing by a driving force produced by the motor; and
a speed reducer configured to reduce rotation of the motor and installed on the lower arm and located between a rotation axis of the motor and the turning portion;
wherein the rotation axis of the motor and a pivot of the axle housing are arranged to be offset from each other, and
wherein the rotation axis of the motor is laterally spaced apart from the turning portion and arranged closer to the vehicle body rather than the turning portion.

2. The steering apparatus as claimed in claim 1, wherein:
the turning portion is mechanically linked via a universal joint to the axle housing.

3. The steering apparatus as claimed in claim 1, wherein:
the rotation axis of the motor is arranged along a pivot that oscillatingly supports the lower arm; and
the speed reducer comprises a worm gear and a worm wheel.

4. The steering apparatus as claimed in claim 3, wherein:
the motor is installed on an upside of the lower arm.

5. The steering apparatus as claimed in claim 4, wherein:
the lower arm is pivotably supported on the vehicle body between two lower-arm supporting portions attached to the vehicle body and spaced apart from each other; and
the motor is located between the two lower-arm supporting portions.

6. The steering apparatus as claimed in claim 4, further comprising:
a tie rod displaceable in a vehicle lateral direction responsively to rotary motion of the motor; and
a knuckle arm integrally connected to the axle housing and mechanically linked to the tie rod,
wherein a straight line, passing through a rotation center of a turning pair of the tie rod and the knuckle arm and a rotation center of a turning pair of the lower arm and the axle housing, is arranged substantially parallel to the pivot of the lower arm.

7. The steering apparatus as claimed in claim 3, wherein:
the speed reducer is accommodated in a speed-reducer casing and has a sector gear; and
the speed-reducer casing has a stopper mechanism formed in the casing for restricting anticlockwise and clockwise angular displacements of the sector gear exceeding predetermined angular-displacement limits by way of abutment with the sector gear.

8. The steering apparatus as claimed in claim 1, wherein:
the motor and the speed reducer are provided for each individual steered road wheel.

9. A steering apparatus, comprising:
an axle housing rotatably supporting a wheel hub on which a steered road wheel is installed;
a lower arm adapted to be oscillatingly supported at one end on a vehicle body and having a turning portion provided at the other end for pivotably supporting the axle housing by the turning portion;
an electric motor installed on the lower arm for turning the axle housing by a driving force produced by the motor; and
a harmonic-drive speed reducer configured to reduce rotation of the motor,
wherein a rotation axis of the motor and a pivot of the axle housing are arranged to be offset from each other, and
wherein the rotation axis of the motor is laterally spaced apart from the turning portion and arranged closer to the vehicle body rather than the turning portion.

10. A steering apparatus, comprising:
an axle housing rotatably supporting a wheel hub on which a steered road wheel is installed;
a lower arm adapted to be oscillatingly supported at one end on a vehicle body and having a turning portion provided at the other end for pivotably supporting the axle housing by the turning portion;
an electric motor installed on the lower arm for turning the axle housing by a driving force produced by the motor; and
a speed reducer configured to reduce rotation of the motor and installed on the lower arm and located between the motor and the turning portion,
wherein the motor is arranged closer to the vehicle body rather than a steering axis serving as a pivot of the axle.

11. The steering apparatus as claimed in claim 10, wherein:
the motor is installed on an upside of the lower arm.

12. The steering apparatus as claimed in claim 11, further comprising:
a steering controller configured to control the motor, the steering controller installed on the lower arm.

13. The steering apparatus as claimed in claim 10, wherein:
the motor and the speed reducer are provided for each individual steered road wheel.

14. A steering apparatus, comprising:
an axle housing rotatably supporting a wheel hub on which a steered road wheel is installed;
a lower arm adapted to be oscillatingly supported at one end on a vehicle body and having a turning portion provided at the other end for pivotably supporting the axle housing by the turning portion;
an electric motor installed on the lower arm for turning the axle housing by a driving force produced by the motor; and
a harmonic-drive speed reducer configured to reduce rotation of the motor,
wherein the motor is arranged closer to the vehicle body rather than a steering axis serving as a pivot of the axle housing.

15. A steering apparatus, comprising:
an axle housing rotatably supporting a wheel hub on which a steered road wheel is installed;
a lower arm adapted to be oscillatingly supported at one end on a vehicle body and pivotably supporting the axle housing at the other end;
an electric motor installed on the lower arm for turning the axle housing by a driving force produced by the motor; and
a speed reducer configured to reduce rotation of the motor,
wherein the motor and the speed reducer are arranged from the vehicle body in that order.

16. The steering apparatus as claimed in claim 15, wherein:
the motor is installed on an upside of the lower arm.

* * * * *